United States Patent
Heinrichs

(10) Patent No.: US 11,788,564 B2
(45) Date of Patent: Oct. 17, 2023

(54) CONNECTION UNIT FOR CONNECTING TWO COMPONENTS WITH A SPACE IN BETWEEN

(71) Applicant: Böllhoff Verbindungstechnik GmbH, Bielefeld (DE)

(72) Inventor: Heinrich Heinrichs, Vlotho (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 372 days.

(21) Appl. No.: 17/289,650

(22) PCT Filed: Oct. 2, 2019

(86) PCT No.: PCT/EP2019/076781
§ 371 (c)(1),
(2) Date: Apr. 28, 2021

(87) PCT Pub. No.: WO2020/088878
PCT Pub. Date: May 7, 2020

(65) Prior Publication Data
US 2021/0396253 A1    Dec. 23, 2021

(30) Foreign Application Priority Data
Oct. 29, 2018  (DE) .......................... 102018126958.7

(51) Int. Cl.
*F16B 5/02* (2006.01)
*B60Q 1/26* (2006.01)

(52) U.S. Cl.
CPC ............ *F16B 5/025* (2013.01); *B60Q 1/2642* (2013.01); *F16B 5/0233* (2013.01); *B60Q 2200/32* (2013.01); *F16B 5/02* (2013.01)

(58) Field of Classification Search
CPC .......... F16B 5/02; F16B 5/0233; F16B 5/025; F16B 5/0275; F16B 33/004; F16B 35/00;
(Continued)

(56) References Cited

U.S. PATENT DOCUMENTS

| 3,429,598 A | 2/1969 | Scheublein, Jr. et al. |
| 5,630,672 A * | 5/1997 | Mc Hale ............ F16C 11/0642 403/135 |

(Continued)

FOREIGN PATENT DOCUMENTS

| CN | 1550683 A | 12/2004 |
| CN | 103097831 A | 5/2013 |

(Continued)

OTHER PUBLICATIONS

English translation of the International Preliminary Report on Patentability for PCT/EP2019/076781 dated Apr. 27, 2021, 9 pages.

(Continued)

*Primary Examiner* — Roberta S Delisle
(74) *Attorney, Agent, or Firm* — Reising Ethington P.C.

(57) ABSTRACT

A connection unit for connecting a first component to a second component with a distance in between. The connection unit has a connection screw having a head in the shape of a first ball segment and a shank. The shank has an outer thread. The connection unit also has a base element having: a second outer thread, and a first portion having a first inner diameter; a through-opening is provided at a second axial end and has a second inner diameter which is smaller than the first inner diameter, and an outer side of the base element is in the shape of a second ball segment. The first portion and the through-opening are distanced axially and are connected by a transition portion, which at least partly provides a bearing surface for the head of the connection screw, and the shank extends through the through-opening.

17 Claims, 12 Drawing Sheets

(58) Field of Classification Search
CPC ...... F16B 43/00; F16B 43/001; B60Q 1/2642; B60Q 2200/32
USPC .................. 411/383, 384, 531, 542, 546
See application file for complete search history.

(56) References Cited

U.S. PATENT DOCUMENTS

| | | | |
|---|---|---|---|
| 5,716,356 | A | 2/1998 | Biedermann |
| 5,904,436 | A * | 5/1999 | Maughan ............ F16C 11/0647 |
| | | | 403/135 |
| 6,715,955 | B2 | 4/2004 | Ginzel |
| 7,658,581 | B2 | 2/2010 | Süßenbach |
| 8,211,155 | B2 * | 7/2012 | Winslow ............ A61B 17/7082 |
| | | | 606/264 |
| 8,215,886 | B2 * | 7/2012 | Campbell ............... F16G 11/05 |
| | | | 411/401 |
| 8,342,787 | B2 * | 1/2013 | Smith .................... F16B 35/02 |
| | | | 411/383 |
| 8,944,736 | B2 | 2/2015 | Figge et al. |
| 10,603,081 | B2 * | 3/2020 | Harper ................ A61B 17/888 |
| 10,603,083 | B1 * | 3/2020 | Gladieux ........... A61B 17/7002 |
| 10,632,897 | B2 | 4/2020 | Hübner et al. |
| 10,851,824 | B2 | 12/2020 | Vorderwisch |
| 2007/0090238 | A1 * | 4/2007 | Justis ................. A61B 17/7038 |
| | | | 248/181.1 |
| 2008/0213065 | A1 | 9/2008 | Sussenbach |
| 2013/0087138 | A1 | 4/2013 | Ubach Cartategui et al. |
| 2017/0008443 | A1 | 1/2017 | Burton |
| 2020/0332819 | A1 | 10/2020 | Matthes et al. |
| 2021/0040975 | A1 | 2/2021 | Vorderwisch |

FOREIGN PATENT DOCUMENTS

| | | |
|---|---|---|
| CN | 108087405 A | 5/2018 |
| DE | 2162339 A1 | 7/1972 |
| DE | 4425357 A1 | 2/1996 |
| DE | 19528489 C2 | 3/2000 |
| DE | 19939172 C2 | 8/2003 |
| DE | 102004021484 A1 | 11/2005 |
| DE | 102008026414 B4 | 4/2010 |
| DE | 102012009173 A1 | 11/2012 |
| DE | 102011054861 A1 | 5/2013 |
| DE | 102016101634 A1 | 8/2017 |
| DE | 102016101910 A1 | 8/2017 |
| GB | 755365 A | 8/1956 |
| GB | 1360449 A | 7/1974 |
| WO | WO2017113015 A1 | 7/2017 |

OTHER PUBLICATIONS

CN Office Action for CN Application No. 201980071458.7 dated Mar. 22, 2022 (19 pages).
Spherical Washers, Conical Seats DIN6319:2001-10, Jan. 2007 (8 pages).
Written Opinion & International Search Report for PCT/EP2019/076781 dated Dec. 17, 2019, (14 pages).

* cited by examiner

CONNECTION UNIT FOR CONNECTING TWO COMPONENTS WITH A SPACE IN BETWEEN

TECHNICAL FIELD

The present disclosure relates to a connection unit for connecting a first component with a second component with a distance in between, a first component with the connection unit, a connection out of two components by means of the connection unit, a manufacturing method for the connection unit as well as a corresponding connection method for connecting two components by means of the connection unit.

BACKGROUND

In many fields of the technology, frequently, two components are to be connected with each other, having a distance in between. In the technological field of the automotive industry, an example for two components that are fastened to each other having a distance in between, is a rear light which is fastened at a vehicle body. Another example is a roof rails which is fastened at the vehicle body.

In the sector of the automotive industry, the components to be connected are increasingly determined by design. For this reason, it happens more and more frequently that the components to be connected at the junctions, i.e. at the openings which are provided for a connection unit are no longer arranged parallel to each other.

Due to freeform surfaces which are difficult to be defined, increasing tolerances caused by a number of components that are arranged next to each other, a warping of the components which is caused by the respective manufacturing method, etc., tolerances can also arise which must be compensated when fastening the two components at each other.

In order to compensate such tolerances, compensating connection units are used. These solutions are regularly assembled such that they can exclusively compensate the distance between the components to be connected. The compensation of such a distance is often carried out by means of a connection unit with an automatic tolerance compensation. Examples for that can be found in DE 10 2012 009 173 A1 and DE 10 2011 054 861 A1.

In case an angle is also to be compensated, e. g. due to a displacement between the junctions of the two components and/or a non-parallel arrangement of the components to be connected at the junctions, this can usually not be realized with the known connection units with tolerance compensation function and if it can, then up to now, only in a non-satisfactory manner due to the very small angle range.

It is known in the state of the art that ball discs according to DIN 6319 are used for the compensation of angles. Here, a screw which connects the two components extends in one line through the components to be connected. This is disadvantageous because the components are screwed with each other in a tensioned manner.

In order to avoid such a tensioned connection between the components to be connected, it is known in the state of the art that the components are connected with each other by a joint. This kind of connection is, however, limited. It can normally only compensate an angle along one axis but not any desired spatial angle.

Therefore, and in addition, an adjustment of the distance between the components to be connected may be necessary, additional components are necessary. In this connection, it is a further disadvantage that for the assembly, both sides of the components to be connected must be accessible. Furthermore, in case of an additional joint, a play between the components to be connected can arise depending on the way of construction. This is also disadvantageous.

It is therefore the object of at least some implementations of the present disclosure to provide a connection unit that is improved compared with the state of the art, which, beside a tolerance compensation with regard to the distance between the components to be connected also provides an angle compensation function, such as a spatial angle compensation function. The improved connection unit may be used even in case of a one-sided accessibility to the components to be connected. Further objects of the present disclosure are the provision of a corresponding first component, a connection between two components, a manufacturing method of the connection unit as well as of a connection method.

SUMMARY

The above object is solved by a connection unit for connecting a first component with a second component with a space or distance in between, a first component with the connection unit, a connection out of a first and a second component by means of the connection unit, a manufacturing method for a connection unit as well as a connection method of a first component with a second component by means of a connection unit. Further embodiments and further developments arise from the following description, the drawings as well as the appending claims.

A connection unit for connecting a first component with a second component with a distance in between comprises a connection screw with a head in the shape of a first ball segment as well as a shank extending from there, with the shank having a first external or outer thread of a first thread direction, a hollow-cylindrically shaped base element which includes the following features: adjacent to a first axial end, a second outer thread of a second thread direction for the fastening in the first component and radially inwardly, a first portion with a first inner diameter are provided, a through opening with a second inner diameter is provided at a second axial end, the diameter being smaller than the first inner diameter, and an outer side of the base element is designed in the shape of a second ball segment, with the first portion and the through opening being axially distanced or spaced from each other and connected by a transition portion, which at least partly provides an abutment surface for the head of the connection screw, and with the shank of the connection screw extending through the through opening. In this way, a pivoting of the connection screw is, with respect to a longitudinal axis of the base element, realizable in a settable spatial angle, as is described in the following. For the better understanding of the connection unit, firstly, the assembly and subsequently, the use for connecting two components is described in the following.

Firstly, the connection screw and the base element are present as separate, independent components. The connection screw is now inserted with the shank ahead from the first axial end of the base element into the same. In doing so, the shank of the connection screw is guided through the through opening at the second axial end of the base element. Thereby, the head of the connection screw is arranged in the first portion of the base element. Thus, the first inner diameter of the base element is bigger than an outer diameter of the head of the connection screw. At the same time, the second inner diameter of the through opening of the base element is bigger than an outer diameter of the first outer thread of the connection screw but smaller than the outer diameter of the head of the connection screw. The transition portion with the abutment surface therefore provides a one-sided limitation for a movement of the connection screw in the inside of the hollow-cylindrically shaped base element in axial direction.

At the end of the insertion process, the head of the connection screw abuts the abutment surface in the inside of the base element. The shank of the connection screw with the first outer thread extends beyond the second axial end of the base element. A further moving of the connection screw in axial direction is prevented due to the one-sided limitation provided by the transition portion. However, in this state, the interaction of the abutment surface of the base element with the head of the connection screw that is designed in the shape of a first conical segment as well as the dimensioning of the second inner diameter in dependency of the outer diameter of the shank of the connection screw enables a pivoting or tilting of a longitudinal axis of the connection screw with respect to the longitudinal axis of the base element. In this connection, this pivoting is not limited to a specific direction but can be realized in any desired spatial direction. This is emphasized by the use of the term spatial angle.

For the further clarification of the functionality, the use of the connection unit in case of a connection between two components is now described. First of all, the base element of the connection unit is screwed into a first opening of the first component. The rotation direction arises due to the second thread direction of the outer thread. The screwing-in can, for example, take place by means of a drive means that is present at the base element, the means being arranged between the second outer thread and the second axial end and will be described in more detail later on. For the sake of completeness, it is pointed out that other alternatives of the screwing-in are possible, too, which, for reasons of clearness, will only be discussed later in the course of the further description.

After the base element has been screwed into the first opening in the first component, the second component is aligned with a second opening with respect to the first component. Provided that the first opening of the first component can be accessed from a side facing away from the second axial end of the base element, the connection screw could be inserted into the base element, provided this has not yet been carried out. With regard to the usability of the connection unit in case of an only one-sided accessibility, the connection screw may already be arranged in the base element at this point in time.

In order to explain the basic functionality, it is assumed that the first opening of the first component and the second opening of the second component are aligned with respect to each other and the respective junctions or connection points run parallel. Consequently, it is sufficient that the longitudinal axis of the connection screw extends along the longitudinal axis of the base element, i.e. both longitudinal axes are congruent.

The second component is then plugged onto the part of the shank of the connection screw which extends beyond the second axial end and a fastening nut is screwed onto the first outer thread of the connection screw for fixation. This takes place in accordance with the first thread direction of the first outer thread. It is advantageous that the first thread direction of the outer thread of the connection screw and the second thread direction of the outer thread of the base element are the same. As soon as the fastening screw has been screwed tight, the position of the connection unit is frozen.

The advantages of the connection unit do, however, only become clear when the junctions of the first and of the second component are not aligned parallel with respect to each other. Due to the above-described possibility of pivoting or tilting the longitudinal axis of the connection screws with respect to the longitudinal axis of the base element, namely into any spatial direction, the longitudinal axis of the connection screw is in this case aligned with the second opening in the second component first. Then, the second component is plugged onto the connection screw in the common way and fixed by means of the fastening nut. The tightening of the fastening nut causes that also the alignment or orientation of the longitudinal axis of the connection screw is fixed or frozen with respect to the longitudinal axis of the base element.

Due to the special design of the base element in the inside as well as the design of the connection screw, both components are not fastened at each other in a tensioned state in contrast to the known state of the art. The loads which act upon the components due to the connection are therefore reduced compared with the known connection units with an angle compensation function. This is a special advantage of the present disclosure.

In a further embodiment, the connection screw comprises at least one first engagement feature at the head and the base element comprises at least one axially extending second engagement feature, which interact with each other for the form-fit transmission of a rotation movement, and the connection screw has a first drive feature at the side of the shank which faces away from the head. By means of the first drive feature, a fine adjustment or setting of the distance between the first and the second component via the connection screw can be realized. Therefore, this embodiment is advantageous in case of an only one-sided accessibility to the components to be connected. Beside a fine adjustment, a screwing-in of the base element into the first opening in the first component by means of the first drive feature can be realized. A force transmission takes place due to the form fit between the first and the second engagement feature. From that it results that the tolerance compensation with respect to the distance between the two components does not take place automatically but by means of a manual setting.

In order to clarify the functionality, it is assumed that the first engagement feature at the head of the connection screw is a radial projection. The second engagement feature in the first portion of the base element is a complementary recess. In order to guarantee the insertability of the connection screw into the hollow-cylindrically shaped base element, the recess extends axially beyond the first portion, i.e. up to the transition portion.

In order to continue to guarantee the pivoting function or angle compensation function, the recess is to be dimensioned bigger than the radial projection at the head of the connection screw in terms of its depth and also in terms of its width. This means that the engagement features are not always in direct engagement but that there is also a play both radially to the outside but also in circumferential direction between them. In case the depth of the projection is for example 1 mm and the width is also 1 mm, the depth of the recess may then be at least 2 mm and the width of the recess may also be at least 2 mm. Therefore, the measurements of the second engagement feature may be bigger by at least the factor 2 compared with the measurements of the first engagement feature. Alternatively, to the embodiment of the first engagement feature as a projection, it can also be designed as a recess. In this case, the second engagement feature is to be configured as a correspondingly designed projection. In case of this embodiment, too, the recess is bigger by at least the factor 2 compared with the projection.

In a further configuration of this embodiment, the connection screw has at least two first engagement features and the base element has at least two second engagement features, with the first and the second engagement features each being spaced from each other circumferentially evenly. By that, the force can be transmitted efficiently and evenly, so that the engagement features may be dimensioned correspondingly small.

In a further embodiment, the at least one second engagement feature is a slot which extends radially through the base element and a portion with a smaller outer diameter is provided between the second outer thread of the base element and the second axial end of the base element. This configuration may be advantageous when the base element consists of metal. At least the abutment surface of the transition portion may be additionally designed in the shape of a truncated cone.

When using this embodiment, the second outer thread of the base element can be clamped with an internal thread in the first opening of the first component in case of a tightening of the fastening nut at the connection screw, due to the design of the second engagement feature as a slot which extends radially through the base element, i.e. the wall of the hollow-cylindrically shaped body. The reason for that may be due to the abutment surface which is designed in the shape of a truncated cone, the head of the connection screw presses against the abutment surface when it is tightened and moves the outer thread radially to the outside. This effect can be realized in a manner with a plurality of circumferentially, evenly distanced slots, e.g. four slots. Due to the exemplary four slots and the segments of the outer thread which are shaped by that, the base element has sufficient flexibility to move radially to the outside. In order to guarantee the above-described functionality of the connection unit, the connection screw may have two first engagement features in this embodiment, too.

The portion with decreased outer diameter further improves the above-described effect of the clamping of the second outer thread of the base element in the internal thread of the first component. For this purpose, the slot may extend axially beyond the transition portion. However, a disadvantage of that is that the axial distance between the second axial end of the base element and the end of the transition portion adjacent to the first portion with the first inner diameter is increased compared with a configuration without this portion with decreased diameter. This has a negative effect on the angle which can be compensated with the connection unit. For example, it accounts for only the half compared with an embodiment without the portion with decreased or reduced outer diameter.

In an alternative embodiment, the second outer thread of the base element is configured in a self-grooving or self-cutting way. This may be advantageous when the base element consists of plastic material and is supposed to be screwed into a first component out of plastic material. Correspondingly designed threads are known and are for example described in DE 10 2016 101 910 A1 or DE 10 2004 021 484 A1, which are referred to in this respect. An advantage of this configuration is that the opening in the first component does not have to be provided with a thread, so that the effort is reduced.

The shank of the connection screw may have a threadless portion adjacent to the head and may include the first outer thread at a distance to the head. By that, too, the pivoting of the connection screw with respect to the longitudinal axis of the base element is influenced in a positive way. For this purpose, the threadless portion may include a smaller outer diameter compared with the first outer thread.

In a further embodiment, the connection screw has, in the threadless portion, a radial projection for storing a sealing element, which may be an O-ring. The radial projection may be configured circumferentially and may serve for the axial supporting of the sealing element. By means of the sealing element, alone or in connection with a further feature, a sealing function of the connection unit can be provided. Furthermore, and with regard to the later described embodiments with abutment element, the O-ring, as an exemplary sealing element, inhibits such an abutment element so that it cannot independently release from the connection screw, for example in transport. In this way, the sealing element therefore fulfils the object of a transport security.

In a further embodiment of the connection unit, the base element has a second drive feature adjacent to the second axial end, which may be between the second axial end and the second outer thread. As already explained in an exemplary way in the beginning, this second drive feature can be used for screwing the base element into the first opening in the first component. In addition, or alternatively, an adjusting of the distance between the first component and the second component can take place by means of the second drive feature. Again, this shows that the tolerance compensation with respect to the distance between the two components does not take place automatically but by means of a manual adjustment.

In a further embodiment of the connection unit, the second inner diameter of the base element continuously tapers from the second axial end in the direction of the transition portion. As a result, the through bore is thus configured in the shape of a truncated cone. It can be achieved by that that the abutment surface for the head of the connection screw which is provided by the transition portion can be designed as big as possible wherein at the same time, the spatial angle which can be specified can be chosen big due to the truncated cone shape of the through bore. For example, the specifiable spatial angle lies at approximately at least 5°, or approximately at least 7.5° and in some implementations may be at least at approximately 10° or more.

A further embodiment of the connection unit includes an abutment element which may be arranged on the shank of the connection screw. On the one hand, the abutment element is in contact with the base element and on the other hand, with the second component when being used. Therefore, the abutment element defines a resting surface for the second component so that the second component can be supported at the abutment element. Due to the fact that the abutment element is arranged on the shank of the connection screw, it follows the latter even in case the connection screw is pivoted.

According to a further embodiment, a first face side of the abutment element has the shape of a third ball segment which interacts with the second ball segment at the second axial end of the base element. In this context, the shape is configured such that the first face side is not arched to the outside but to the inside. In this way, the third ball segment and the second ball segment are in engagement with each other in a planar manner. By that, the joint pivoting of the connection screw and the abutment element may be designed efficiently.

The abutment element has a radial outer ring as well as a radial inner ring at a second face side which faces away from the base element, wherein the radial inner ring provides for an axial anti-loss security for the connection screw. In this embodiment, the abutment element may be made of metal. After having arranged the abutment element on the shank of the connection screw, the inner ring of the abutment element is radially pressed into the inside, i.e. stamped, with a tool that is provided for this purpose. This may take place on a threadless portion of the shank of the connection screw. Due to the stamping of the inner ring, the abutment element now provides an axial anti-loss security for the connection screw. An axial movement of the connection screw into the insertion direction is therefore restricted by the abutment surface, while an axial movement contrary to the insertion direction is limited by the stamped abutment element. In this embodiment, the connection unit may be handled efficiently and may be prepared for automated processes.

In another alternative embodiment, the abutment element comprises at least one radially inwardly protruding projection in a through opening as well as a third drive feature at a radial outer side, so that the abutment element can be screwed onto the connection screw and provides an axial anti-loss security for the connection screw. The abutment element that is screwed on restricts an axial movement of the connection screw contrary to the insertion direction, analogously to the above embodiment. For efficient screwing of the abutment element, the third drive means may be advantageously arranged adjacent to the second face side which faces away from the base element. As an example, the radially inwardly protruding projection is a partial thread. It is configured such that it secures the connection screw in an axial direction, namely contrary to the insertion direction of the connection screw into the base element, as is explained above. An advantageous further function is that the abutment element can be fastened in abutment to the outer side at the second axial end of the base element in a way that the connection screw can maintain a pre-determinable spatial angle position. If the longitudinal axis of the base element, with regard to the bottom, is for example arranged horizontally, the connection screw does not automatically pivot down, i.e. in the direction of the bottom. This pre-alignment/pre-orientation or pre-fixation therefore facilitates finding the bore or opening in the second component as otherwise, the connection screw would be arranged in any desired spatial angle position, which would make the finding of the opening in the second component difficult. Alternatively, to this embodiment, the function of the pre-fixation of the connection screw can also be realized by a narrow fitting between the head of the connection screw and the correspondingly configured first portion in the inside of the base element.

In this embodiment, the abutment element is advantageously made of plastic material. The radial projection may be designed such that in case of a too high axial load, it breaks off. The abutment element may be screwed onto the connection screw as far until it is arranged in a threadless portion. If this has not happened or if there is no threadless portion, this configuration provides that in case of a tightening of the fastening nut, the abutment element is pressed against the second ball segment of the base element with the first face side and the shape of the third ball segment which is present there. In other words, the radially inwardly protruding projection, i.e. the exemplary partial thread, leads to an overdetermination of the connection unit. If, for example, the abutment element would not be tightened before the second component is fastened by means of the fastened nut at the connection screw, a gap between abutment element and base element would be present. As a result, the exemplary partial thread would hinder the proper functioning of the connection unit. Therefore, the partial thread is configured such that in such a case, it can fail in order to guarantee a safe screwing. In this way, the proper functioning of the connection unit is therefore guaranteed.

The abutment element may comprise a sealing element at its second face side which faces away from the base element. The sealing element can for example be one or more sealing lips. In this way, a sealing function to the second component can be provided.

A first component is characterized by the fact that a base element of a connection unit may be screwed therein, into a first opening. With regard to the arising advantages, reference is made to the explanations regarding the connection unit.

A connection out of a first and a second component is characterized by the fact that a base element of a connection unit is screwed into the first component and that the first outer thread of the connection screw extends at least partially through an opening in the second component and is in engagement with a fastening nut, whereby the connection screw is fixed in a predeterminable spatial angle. Spatial angle means, as was already described in the beginning, an angle between the longitudinal axis of the connection screw and the longitudinal axis of the base element which can be realized in any desired direction in the distance. In other words, the spatial angle cannot only be realized into one direction but circumferentially. In order to avoid repetitions, reference is made to the explanations regarding the connection unit in this connection as well as in connection with the arising advantages.

A manufacturing method for a connection unit comprises the steps: providing a connection screw and a base element as well as inserting the connection screw with the shank first from the first axial end of the base element into the base element, wherein the step of providing the connection screw and the base element comprises the manufacturing of the connection screw and/or the base element by means of one of the following methods: molding, injection-molding, additive methods and machining methods. The connection unit is manufactured by means of the manufacturing method so that in order to avoid repetitions, reference is made to the corresponding explanations, with regard to the arising advantages.

In one embodiment of the manufacturing method, the connection screw is made of metal and the base element is made of plastic material or metal. In this way, the material can be adapted to the components to be connected, wherein the design of the connection screw out of metal provides for a reliable force transmission.

The manufacturing method may include the steps: providing an abutment element and arranging the abutment element on the portion of the shank of the connection screw which projects beyond the second axial end of the base element, in a way that the abutment element may provide an axial anti-loss security for the connection screw. With regard to this configuration, reference is made to the explanations in connection with the axial anti-loss security for the connection screw and the advantages which arise as a result.

A connection method of a first component with a second component with a distance in between by means of a connection unit comprises the following steps: screwing the base element of the connection unit into a first opening in the first component, arranging the shank of the connection screw in a second opening of the second component so that the first outer thread of the connection screw extends at least partially through the second opening in the second component, and screwing a fastening nut onto the first outer thread of the connection screw for the purpose of fixing the position of the first and the second component relative to each other. Thus, a connection between two components can be established with the connection method, wherein the spatial angle of the connection screw is fixed after fastening the fastening nut. With regard to the advantages, reference is again made to the explanations above.

In a further embodiment of the connection method, the connection screw includes at least one first engagement feature at the head and a first drive feature at the side of the shank which faces away from the head, and the base element includes at least one second engagement feature, and the step of screwing-in the base element takes place by means of the first drive feature or the method includes the further step: setting a distance between the first and the second component by rotating the connection screw and thus the base element by means of the first drive feature.

BRIEF DESCRIPTION OF THE DRAWINGS

In the following, the present disclosure will be described in detail with reference to the drawings. In the drawings, the same reference signs denote the same components and/or elements. It shows.

DETAILED DESCRIPTION

In the following, two embodiments of the connection unit are described in detail. The connection unit may be characterized by the fact that it is adjustable both axially as well as radially, i.e. its length can be adjusted manually to a desired distance between two components. Furthermore, the connection unit guarantees even in case of a not parallel arrangement of the junctions/connection points of the two components to be connected that the components are not connected with each other in a tensioned manner. Optionally, a sealing function can be provided.

Therefore, the connection unit can be used everywhere where two components are to be connected with a distance in between and where possibly, an angle between the junctions must be compensated, i.e. where the junctions are not aligned parallel with respect to each other. An example for that is the fastening of lamps, or rear lights, or of the roof rails at the vehicle body of a motor vehicle.

Figure 1:
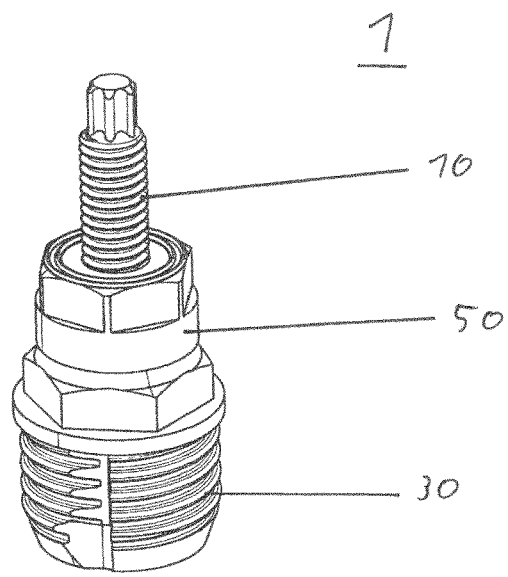
FIG. 1 a perspective view of a first embodiment of a connection unit.
Figures 2A, 2B:
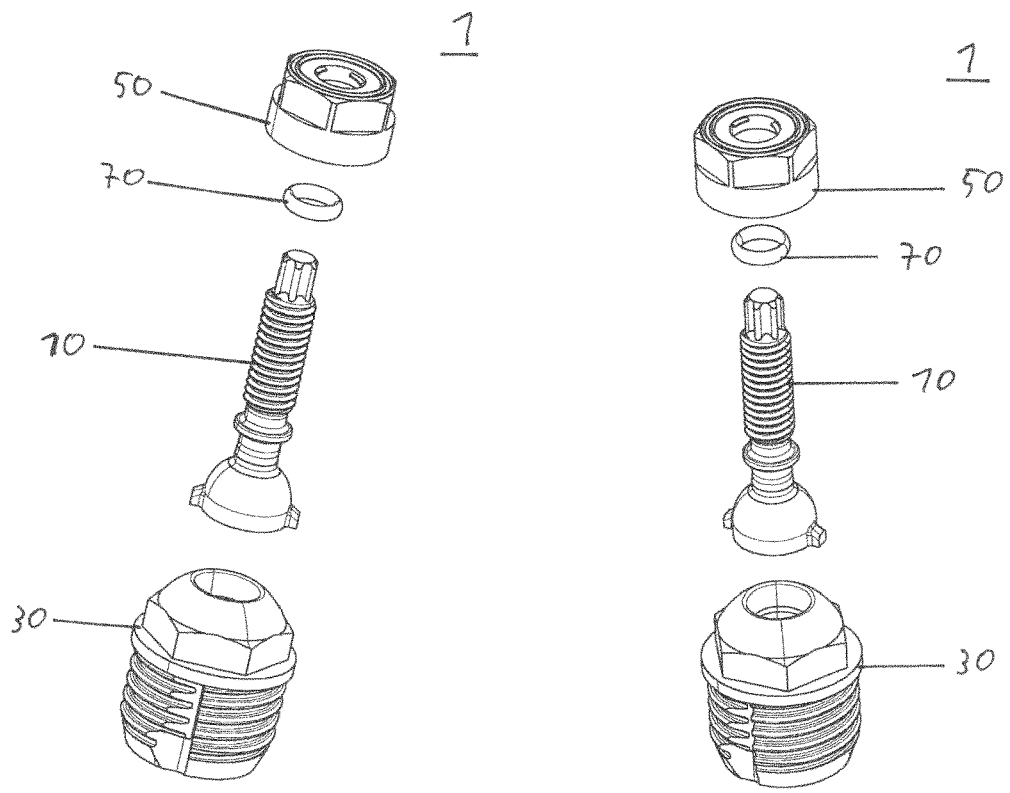
FIG. 2a a first perspective view of the individual components of the connection unit according to FIG. 1, FIG. 2b a second perspective view of the individual components of the connection unit according to FIG. 1, FIG. 3 a perspective view of the connection screw according to FIGS. 2a and 2b, FIG. 4a a perspective view of the base element according to FIGS. 2a and 2b, FIG. 4b a view of the base element according to FIGS. 2a and 2b from below, FIG. 5a a perspective sectional view of the base element according to FIGS. 4a and 4b, FIG. 5b a further sectional view of the base element according to FIGS. 4a and 4b, FIG. 6a a perspective view of the abutment element according to FIGS. 2a and 2b, FIG. 6b a top view onto the abutment element according to FIGS. 2a and 2b, FIG. 7 a sectional view of the abutment element according to FIGS. 6a and 6b, FIG. 8 a perspective view of the sealing element according to FIGS. 2a and 2b, FIG. 9a a first stage of the assembling of the connection unit according to FIGS. 2a and 2b, FIG. 9b a second stage of the assembling of the connection unit according to FIGS. 2a and 2b, FIG. 9c a third stage of the assembling of the connection unit according to FIGS. 2a and 2b, FIG. 10 a perspective view of the connection unit according to FIG. 1 with a cut through the base element, FIG. 11 a view of the connection unit according to FIG. 1 from below, FIG. 12 a sectional view of the connection unit according to FIG. 1, FIG. 13 a sectional view of the connection unit according to FIG. 1 in the installed state, FIG. 14 a perspective view of a second embodiment of a connection unit, FIG. 15 an explosion view of the connection unit according to FIG. 14, FIG. 16 a perspective view of the connection screw according to FIG. 15, FIG. 17a a perspective view of the base element according to FIG. 15, FIG. 17b a view of the base element according to FIG. 15 from below, FIG. 18a a perspective sectional view of the base element according to FIGS. 17a and 17b, FIG. 18b a sectional view of the base element according to FIGS. 17a and 17b, FIG. 19a a sectional view of the abutment element according to FIG. 15, FIG. 19b a view of the abutment element according to FIG. 15 from above, FIG. 20 a second perspective view of the abutment element according to FIG. 15 from above, FIGS. 21a, b, c different stages of the assembly of the connection unit according to FIG. 15, FIG. 22 a sectional view of the connection unit according to FIG. 14, FIG. 23 a sectional view of the connection unit according to FIG. 14 in the installed state, FIG. 24 a schematic process sequence of an embodiment of a manufacturing method for the connection unit, and FIG. 25 a schematic process sequence of an embodiment of a connection method with the connection unit.

In the following and with respect to FIGS. 1-13, a first embodiment of the connection unit 1 is discussed. The connection unit 1 consists of a connection screw 10, a hollow-cylindrically shaped base element 30 as well as an abutment element 50. As can be seen in FIGS. 2a and 2b, a sealing element 70 is furthermore provided. For the better understanding, the individual components are discussed in the following.

Figure 3:
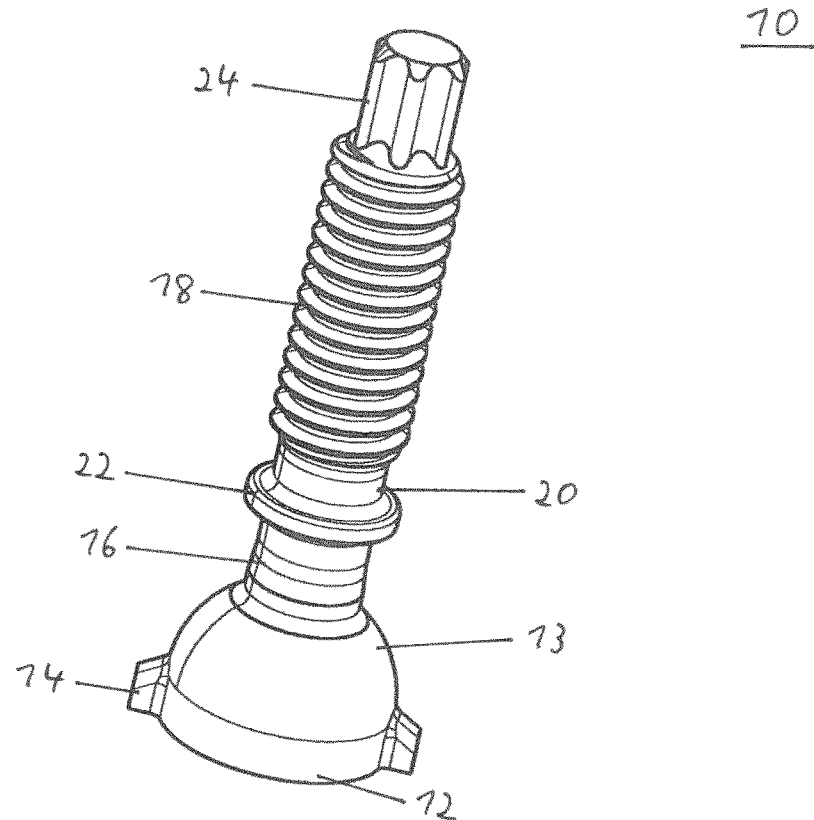

FIG. 3 shows the connection screw 10 which comprises a head 12 as well as a shank 16 extending from the head 12. The connection screw 10 may consist of metal. The head 12 has the shape of a first ball segment 13, with two first engagement features 14 being provided at the axial end. The two first engagement features 14 are two radial projections, which are evenly distanced from each other circumferentially. They interact with complementary designed second engagement features 48 of the base element 30, which is also described later.

Figures 8, 9A, 9B, 9C:
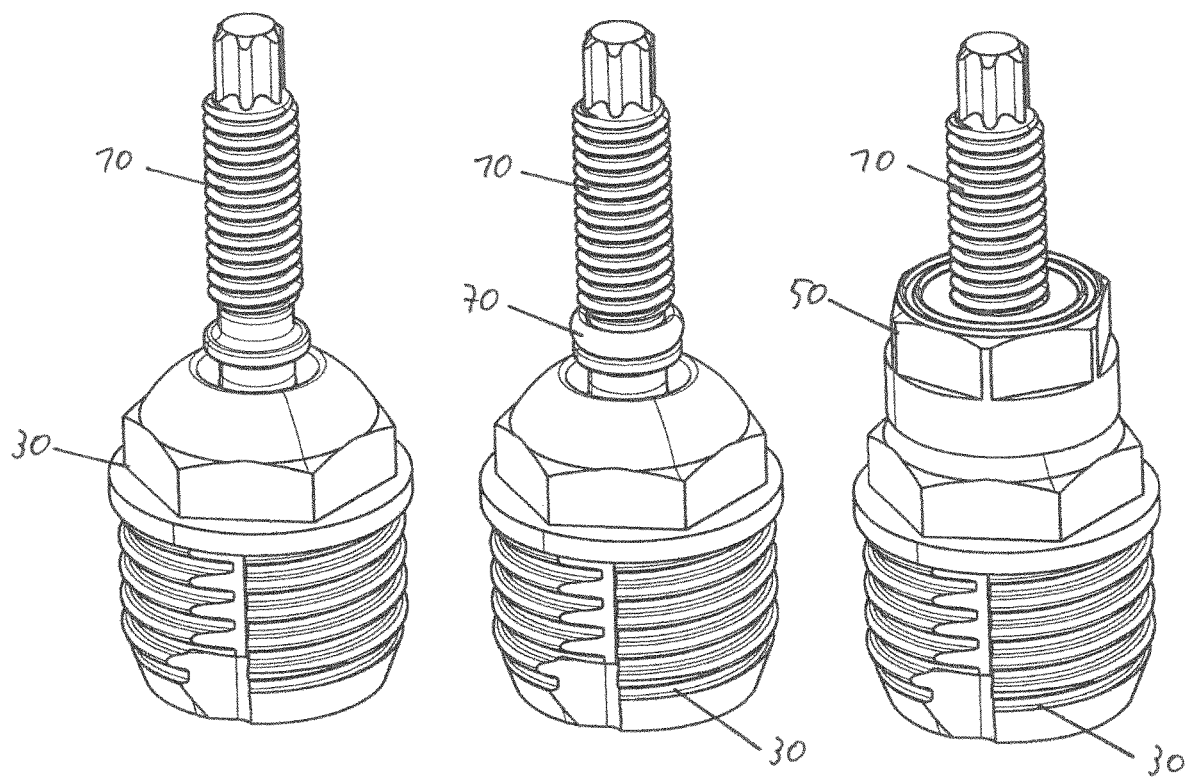

The shank 16 comprises a first outer thread 18 of a first thread direction. Furthermore, the shank 16 comprises a threadless portion 20 which is arranged between the first outer thread 18 and the head 12. A radial, circumferential projection 22 is provided in the threadless portion, on which the sealing element 70 is secured axially, as is for example shown in FIG. 9. The sealing element 70 is for example an O-ring, as illustrated in FIG. 8. Furthermore, the O-ring as an exemplary sealing element 70 hinders an abutment element 50 which is described later. Therefore, the abutment element 50 cannot release independently from the connection screw 10, e. g. during transport. Thus, the sealing element 70 provides the function of a transport security.

Finally, an end of the shank 16, which is located at a distance from the head 12, furthermore includes a first drive feature 24. A tool for rotating the connection screw 10 can engage at the first drive feature 24.

Figure 4A:
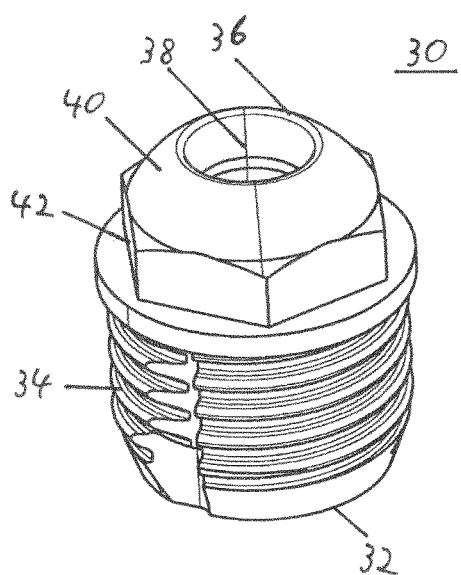
Figure 4B:
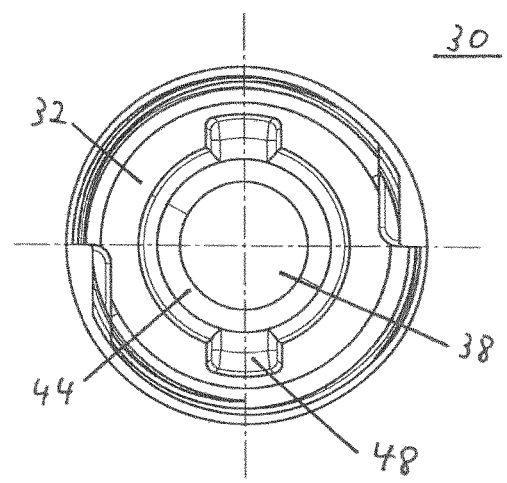
Figure 5A:
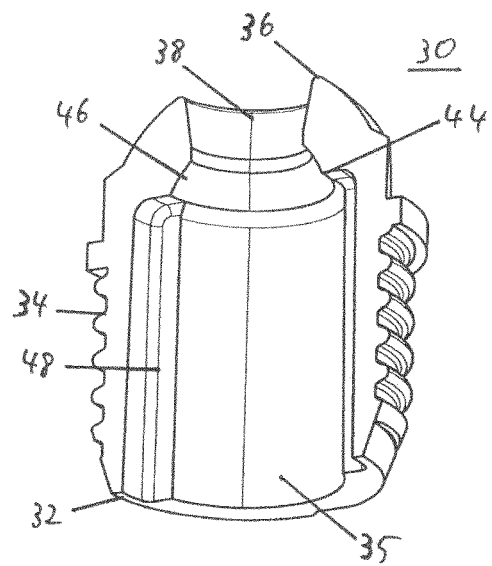
Figure 5B:
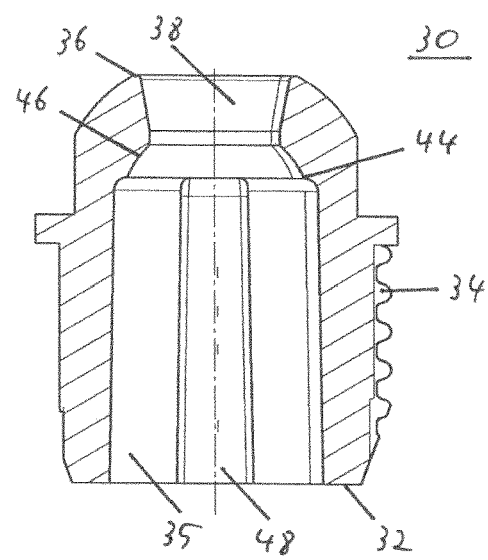

With reference to FIGS. 4a and 4b as well as 5a and 5b, the hollow cylindrically shaped base element 30 is now described in more detail. In this context, firstly, the outer design based on FIGS. 4a and 4b as well as subsequently, the inner design with regard to FIGS. 5a and 5b are dealt with. In this embodiment, the base element 30 is made of plastic material.

Adjacent to a first axial end 32, the base element 30 has a second outer thread 34 of a second thread direction. The base element 30 is later fastened in the first component A by means of the second outer thread 34. In the illustrated embodiment, the base element is made of plastic material, wherein it is also supposed to be fastened in a plastic component as the first component A. The second outer thread 34 may be a thread which may be specifically designed for a plastic-plastic connection, the thread being self-grooving or self-cutting. In this way, in comparison with a metal-metal thread connection, a play-free adjustment of the base element 30 in the first component A is enabled. Furthermore, the second outer thread 34 is designed in a self-locking way. Corresponding threads are for example described in DE 10 2016 101 910 A1 or DE 10 2004 021 484 A1, which are referred to in this regard. The first thread direction of the first outer thread 18 of the connection screw 10 and the second thread connection of the second outer thread 34 of the base element 30 may be the same.

The hollow-cylindrical base element 30 comprises a through opening 38 at a second axial end 36. Furthermore, the outside is designed in the shape of a second ball segment 40. A first drive feature 42 is provided between the second ball segment 40 and the outer thread 34. The base element 30 is screwable into the first component A by means of the first drive feature 42.

In the inside, and with reference to FIGS. 5a and 5b, the hollow-cylindrically shaped base element includes a first portion 35 having a first inner diameter and being adjacent to the first axial end 32. The through opening 38 has a second inner diameter which is smaller than the first inner diameter. In the illustrated embodiment, the second inner diameter constantly tapers from the second axial end 36 in the direction of the first axial end 32 of the base element 30.

Furthermore, with regard to FIGS. 5a and 5b, the through opening 38 and the portion 35 with the first inner diameter are axially distanced from each other and connected by means of transition portion 44. As the through opening 38 and the portion 35 with the first inner diameter are axially distanced, the transition portion 44 cannot consist of one horizontal step, only. Rather, the transition portion 44 includes at least one portion which runs in the direction of the second axial end 36. It may be this portion which constitutes an abutment surface 46 for at least a part of the first ball segment 13 of the connection screw 10. The abutment surface 46 may be adapted to the first ball segment 13 of the connection screw 10 in terms of the shape.

In the first portion 35 of the base element 30, two second engagement features 48 are provided, which are designed complementary to the first engagement features 14 of the connection screw 10. In the present example, the second engagement features 48 are therefore shaped by two radial recesses which extend axially in the first portion 35 of the base element 30. In order to guarantee a desired functionality of the connection unit 1, the recesses have a bigger depth and width compared with the depth and width of the recesses at the head 12 of the connection screw 10. This will be discussed within the description of the functionality.

Figure 6A:
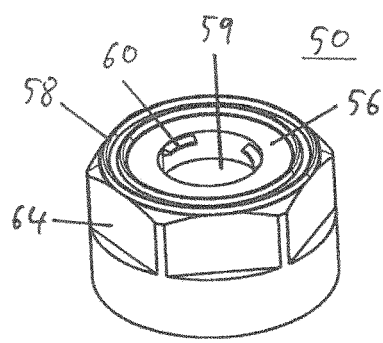
Figure 6B:
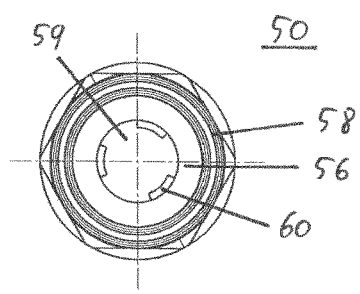
Figure 7:
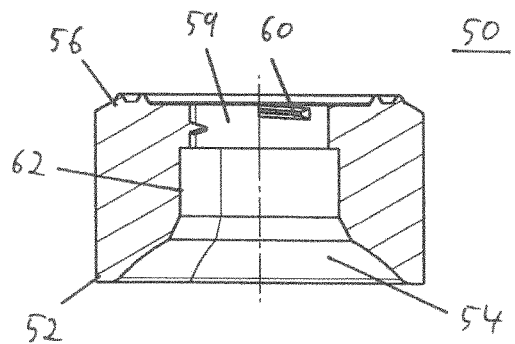

Now, with reference to FIGS. 6a, 6b and 7, the abutment element 50 is described in more detail, which is also made of plastic, comprises a through opening 59 and, in use, is arranged on the shank 16 of the connection screw 10. A first face side 52 of the abutment element 50 has the shape of a third ball segment 54. The third ball segment 54 interacts with the second ball segment 40 of the base element 30 later and is therefore, in terms of the shape, adapted to the second ball segment 40.

The abutment element 50 has a sealing element 58 at a second face side 56 which faces away from the base element 30, which may be one or more sealing rings. This sealing element 58 provides a sealing function regarding the second component B, which is later described with reference to FIG. 13.

At the outside, the abutment element 50 furthermore has a third drive feature 64, which may be adjacent to the second face side 56. The third drive feature 64 depicts an engagement point for a tool in order to rotate the abutment element.

In the through opening 59 of the abutment element 50, at least one radially inwardly protruding projection 60 is provided. The projection 60 serves for causing the abutment element 50 to be screwable onto the first outer thread 18 of the connection screw 10. Therefore, the projection 60 can have the shape of a corresponding internal thread and can extend circumferentially by, for example, 360°. For example, the radially inwardly protruding projection 60 is a partial thread. It is configured such that it secures the connection screw 10 in axial direction contrary to the insertion direction of the connection screw 10 into the base element 30. Due to the partial thread, the abutment element 50 can be brought into abutment with the second ball segment 40 of the base element 30 in a further embodiment, in such a manner that the connection screw 10 maintains a pre-adjustable spatial angle position. The connection screw 10 is thus pre-fixable or pre-alignable/pre-orientable. If the longitudinal axis of the base element 30 is for example arranged horizontally with respect to a bottom, the connection screw 10 now does not automatically pivot downwards, i.e. in the direction of the bottom. This facilitates a finding of the bore or opening in the second component B in a special way, as the connection screw 10 would otherwise be arranged in any spatial angle position, which would exacerbate the finding of the opening in the second component B. Alternatively to this embodiment, the function of the pre-fixing of the connection screw 10 can also be realized by means of a tight fitting between head 12 of the connection screw 10 and the correspondingly designed first portion 35 in the inside of the base element 30, something that may be relevant with regard to the later described second embodiment of the connection unit 100 in order to realize a pre-fixing. Similarly, other approaches for realizing a pre-fixing are possible.

The radially inwardly projecting projection 60, i.e. the exemplary partial thread, leads to an overdetermination of the connection unit 1. If, for example, the abutment element 50 was not tightened before a fastening of the second component B by means of the fastening nut C at the connection screw 10, there would be a gap between abutment element 50 and base element 30. This would lead to the exemplary partial thread hindering the proper functioning of the connection unit 1. Therefore, the partial thread is configured such that it can fail in such a case in order not to prevent a secure screwing.

While the projection 60 is arranged adjacent to the second face side 56 in the through opening 59, a sealing surface 62 is provided adjacent to the first face side 52, the sealing surface 62 interacting with the sealing element 70. The sealing element 70 is for example an O-ring, as is illustrated in FIG. 8. The sealing element 70 blocks or hinders the abutment element 50, so that it is secured against a releasing, which may be when transporting the connection unit 1, as is described above.

With reference to FIGS. 9a, 9b and 9c, the assembly of the connection unit 1 is now explained. In a first step and as illustrated in FIG. 9a, the connection screw 10 is inserted into the base element 30 with the shank 16 first in a way, that the shank 16 extends through the through opening 38 and the head 12 abuts the abutment surface 46.

From this functionality, it becomes clear that the first inner diameter of the base element 30 is bigger than an outer diameter of the head 12 of the connection screw 10. Furthermore, the second inner diameter of the through opening 38 of the base element 30 is bigger than an outer diameter of the first outer thread 18 of the connection screw 10 but smaller than the outer diameter of the head 12 of the connection screw 10. Therefore, the transition portion 44 with the abutment surface 46 therefore provides a one-sided limitation for a movement of the connection screw 10 in the inside of the hollow-cylindrically shaped base element 30 in the axial direction, which may be in the insertion direction of the connection screw 10.

In this state, in which the head 12 abuts the abutment surface 46, the interaction of the abutment surface 46 and of the head 12 as well as the dimensioning of the second inner diameter depending on the outer diameter of the shank of the connection screw 10 enable a pivoting or tilting of the longitudinal axis of the connection screw 10 with regard to the longitudinal axis of the base element 30. In this connection, this pivoting is not limited to a certain direction but can be realized in any desired spatial direction. This is emphasized by the use of the term spatial angle. Furthermore, in this state, a center point of the second ball segment 40 of the base element 30 may correspond to the center point of the first ball segment of the head 12 of the connection screw 10.

In a second step, the sealing element 70 is now arranged on the shank 16 of the connection screw 10, as is shown in FIG. 9b. Here, the radial, circumferential projection 22 serves for the axial securing of the sealing element 70. In turn, the sealing element 70 serves for the axial sealing between the connection screw 10 and the abutment element 50 which is yet to be arranged on the sealing screw 10. Furthermore, the sealing element 70 later prevents an unintentional releasing of the abutment element 50, which may be during the transport of the connection unit 1.

In a concluding, third step, which is illustrated in FIG. 9c, the abutment element 50 is screwed onto the connection screw 10. Due to the projection 60, which is provided for screwing the abutment element 50 onto the connection screw 10, the connection screw 10 is axially secured in the base element 30 against falling out. The connection unit 1 which may be established in this way may be suitable for an automated processing, too.

In doing so, the abutment element 50 is screwed onto the connection screw 10 as far until the projection 60 is no longer in engagement with the first outer thread 18 but is arranged in the threadless portion 20. In this state, the third ball segment 54 also abuts the second ball segment 40. In this way, the third ball segment 54 is designed complementary regarding the second ball segment 40 of the base element 30, so that both interact optimally with each other. A center point of the third ball segment 54 may correspond to the center point of the first ball segment 13. In an alternative embodiment, the projection 60, which is for example a partial thread, engages the first outer thread 18 of the connection screw 10 also in the case when the third ball segment 54 abuts the second ball segment 40. In this way, a prefixing of a spatial angle position of the connection screw 10 can be undertaken, as is described above.

In order to prevent a mal functioning of the connection unit 1 in case the abutment element 50 is not completely screwed on, i.e. when the third 54 and the second ball segment 40 do not abut each other at least partly, the projection 60 in the through opening 59 of the abutment element 50 may be designed such that it yields or breaks when an axial load is applied, i.e. a load along the longitudinal axis of the connection screw 10. In this way, it is guaranteed that at the latest when fastening the second component B, the third ball segment 54 is brought into abutment with the second ball segment 40.

In other words, the radially inwardly protruding projection 60, i. e. the exemplary partial thread, leads to an overdetermination of the connection unit 1. When, for example, the abutment element 50 was not tightened by means of the fastening nut C at the connection screw 10 before a fastening of the second component B, there would be a gap between the abutment element 50 and the base element 30. This would lead to the exemplary, partial thread hindering the proper function of the connection unit 1. Therefore, the partial thread is configured such that it can fail in such a case in order to guarantee a safe screwing.

Figure 10:
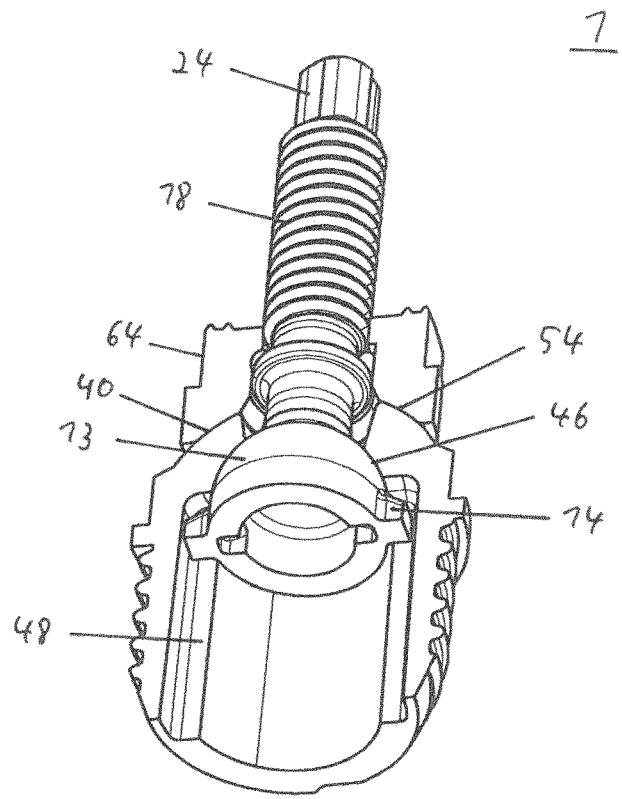
Figure 11:
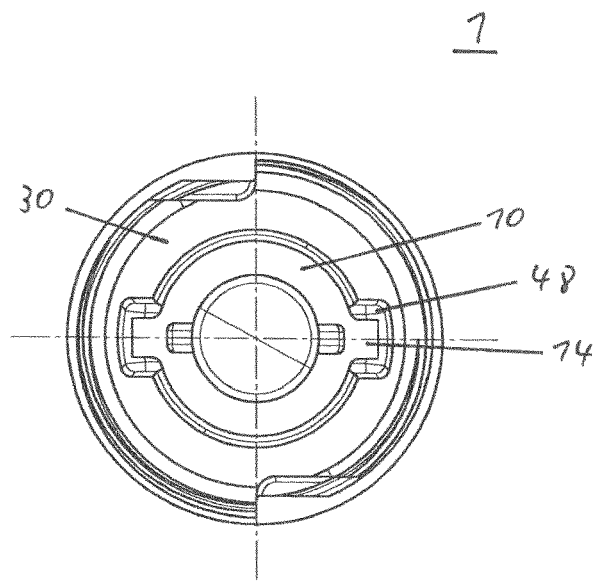

FIGS. 10 and 11 emphasize the interaction of the first 14 and second engagement features 48 which serve for the form-fit force transmission, e.g. when rotating the connection screw 10 onto the base element 30. In order to guarantee the possibility of the pivoting or tilting of the longitudinal axis of the connection screw 10 with regard to the longitudinal axis of the base element 30, the second engagement features 48 have a bigger radial extension as well as a larger width than the first engagement features 14. This means that the first 14 and second engagement features 48 are not configured in a fitted manner but that there is an intended play. In other words, this means that the recesses compared with the projections are over-dimensioned, e.g. by the factor 2.

Figure 12:
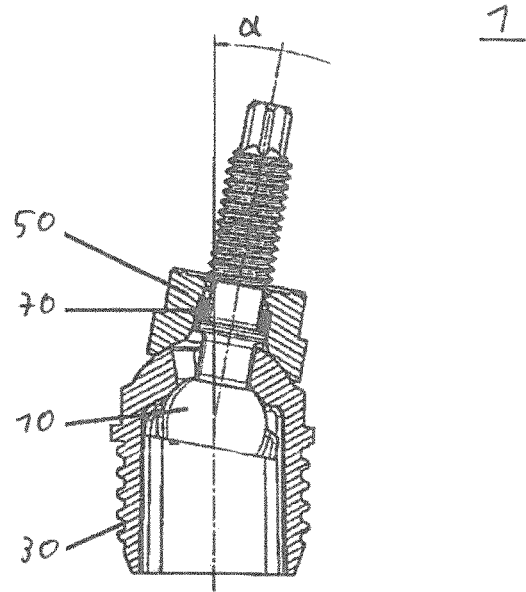

FIG. 12 shows the connection unit 1 in a pivoted state. In this connection, it can be seen that the abutment element 50 has followed the movement of the connection screw 10. A realizable spatial angle $\alpha$ is for example approximately 10°.

Figure 13:
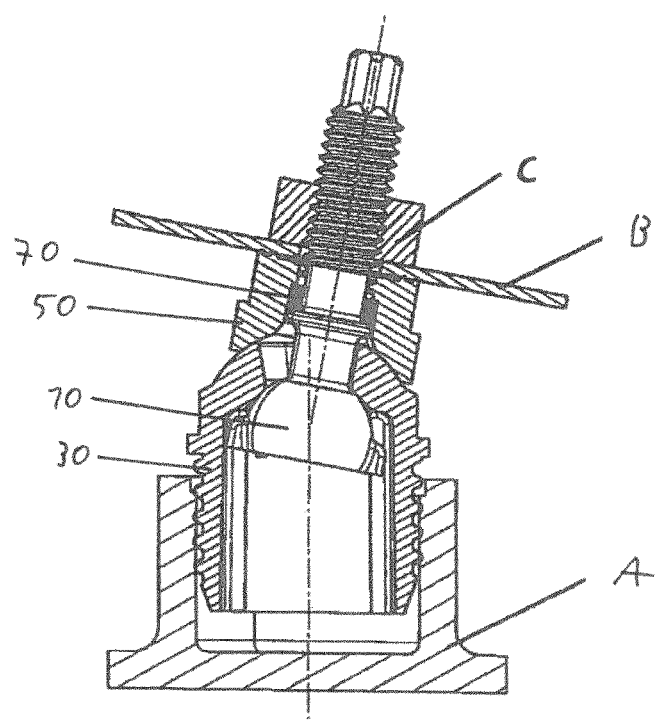
Figure 14:
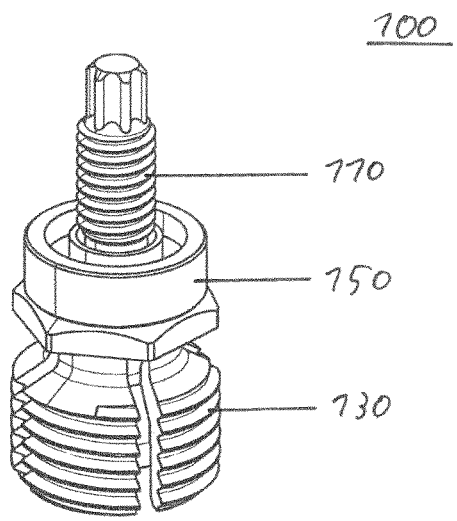
Figure 15:
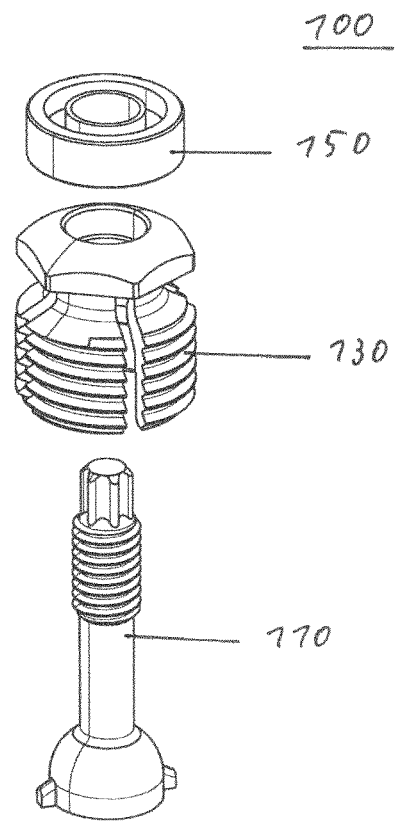

With reference to FIG. 13, the use of the connection unit 1 is now explained. Firstly, the connection unit 1 is screwed into an opening in the first component A via the second outer thread 34 of the base element 30. This takes place via either the first drive feature 24 at the connection screw 10 or via the second drive feature 42 of the base element. As an example, the base element 30 as well as the first component A are made of a plastic material. As in this case, as explained above, the second outer thread 34 may be configured self-cutting or self-grooving, the opening does not have to include a thread. Alternatively, when the opening has a thread, already, when using other material combinations.

The outer thread 34 enables an adjustment in the direction of the longitudinal axis of the base element 30. This means that by that, tolerances in the distance between the two components A and B can manually be compensated by rotating the base element 30.

An advantage of the self-cutting or self-grooving outer thread 34 in this connection is, that a play-free adjustment can be realized. Due to a self-locking of the outer thread 34, an unintentional axial adjustment of the base element 30 and thus of the connection 1 is furthermore prevented.

After fastening of the base element 30 and thus of the connection unit 1 in the first component A, the second component B is plugged onto the connection screw 10. Ideally, the connection unit 1 is already arranged such that when the second component B abuts the second face side of the abutment element 50, the distance is adjusted correctly.

As can be seen in FIG. 13, the junctions of the two components A, B are not aligned parallel to each other. Therefore, and due to the above-described possibility to pivot or tilt the longitudinal axis of the connection screw 10 with respect to the longitudinal axis of the base element 30, namely into any desired spatial direction, the longitudinal axis of the connection screw 10 is first of all aligned with the second opening in the second component B. Then, the second component B is plugged onto the connection screw 10 and fixed by means of the fastening nut C. The tightening of the fastening nut C causes the alignment of the longitudinal axis of the connection screw 10 to be fixed or frozen with respect to the longitudinal axis of the base element 30. In addition, a sealing function is provided due to the sealing element 58 at the second face side 56 which abuts the second component B of the abutment element 50, as well as of the sealing element 70. In this connection, the sealing element 70 does not take up any force but is only radially compressed in the abutment element 50. As already explained above, the O-ring as an exemplary sealing element 70 therefore blocks the abutment element 50 so that the latter does not independently release from the connection screw 10, which may be during transport.

Due to the special design of the base element 30 in the inside as well as of the design of the connection screw 10, the two components A, B are not fastened at each other in a tensioned state, in contrast to the known state of the art. The loads which act upon the components A, B due to the connection are therefore reduced compared with the known connection units with an angle compensation function. This is a special advantage of the present disclosure.

For the case, that the desired distance between the two components A, B is not realized by the connection unit 1, the fastening nut C is released. Now, a manual setting of the axial length of the connection unit 1 to the desired distance can take place by means of the first drive feature 24. The rotation movement of the connection screw is transferred onto the base element by means of the first engagement features 14 via the second engagement features 48. After that, the fastening nut C is tightened again. Of course, the corresponding setting can also be realized before the initial tightening of the fastening nut C or before screwing the fastening nut C onto the connection screw 10.

Subsequently and with respect to FIGS. 14 to 23, a second embodiment of connection unit 100 is discussed. This one as well comprises a connection screw 110, a hollow cylindrically shaped base element 130 as well as an abutment element 150. With regard to same features, the explanations with respect to the first embodiment of the connection unit 1 therefore apply analogously to the second embodiment of the connection unit 100.

In the second embodiment, the base element 130 and the abutment element 150 may also consist of metal, in contrast to the first embodiment. Due to the different choice of material, another construction of the base element 130 and of the abutment element 150 may be achieved, even if the corresponding construction of the first embodiment of the connection unit may also be realizable with metal. In the same way, the construction of the second embodiment with plastic instead of metal which has been discussed herein is realizable, too.

Figure 16:
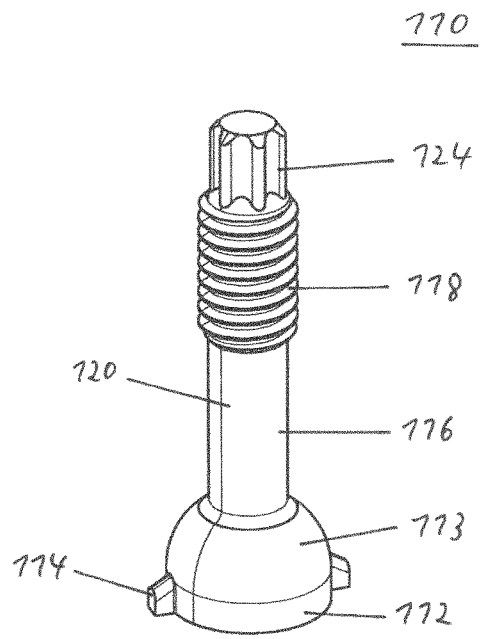
Figures 17A, 17B:
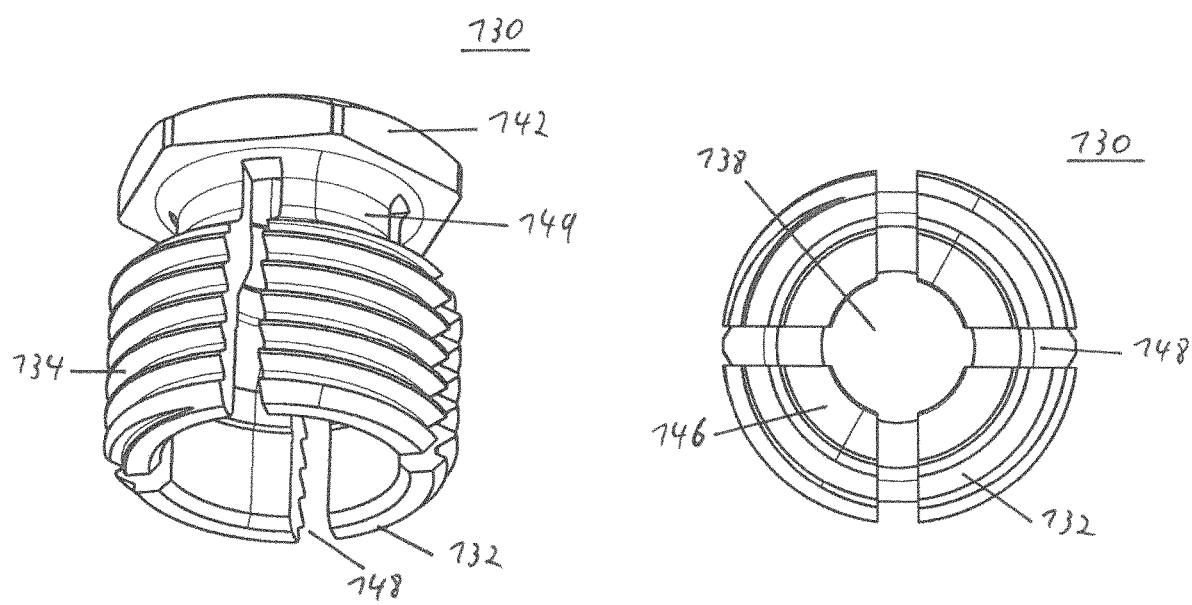
Figure 18A:
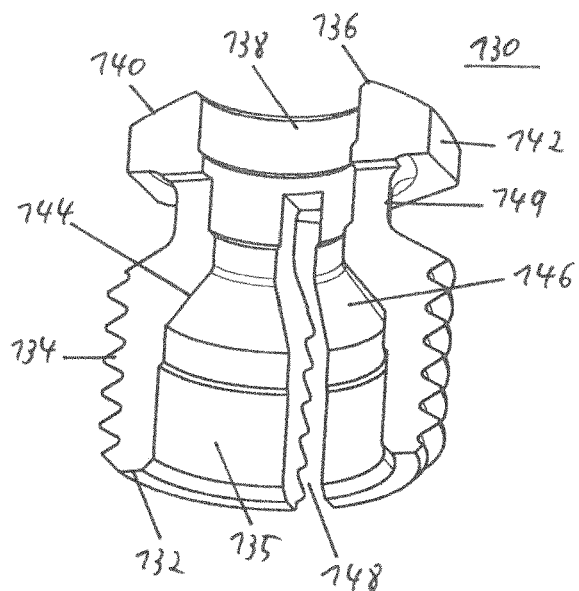
Figure 18B:
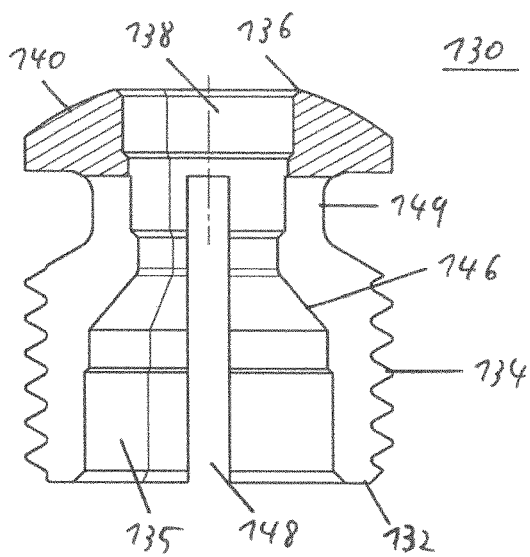

With regard to FIG. 16, the connection screw 110 is constructed analogously to the connection screw 10. This may apply to the head 112 in the shape of a first ball segment 113 with the first engagement features 114 as well as the shank 116 with the first outer thread 118 of a first thread direction, the threadless portion 120 and the first drive feature 124.

In contrast to the connection screw 10 of the first embodiment of the connection unit 1, the connection screw 110 of the second embodiment of the connection unit 100 does not comprise a radial, circumferential projection in the threadless portion. Consequently, in the later use, no sealing element is arranged on the shank 116, so that this embodiment does not provide any sealing function. This becomes clear later in the explanation regarding the abutment element 150, too.

The base element 130 of the second embodiment of the connection unit 100 is also constructed generally analogously to the base element 30 of the first embodiment of the connection unit 1. Thus, with respect to FIGS. 17*a*, 17*b*, 18*a* and 18*b*, the base element 130 includes a second outer thread 134 of a second thread direction adjacent to a first axial end 132 and a through opening 138 as well as a second ball segment 140 at a second axial end. Similarly, a second drive feature 142 is provided. The drive feature 142 of the base element 130 can, just as the drive feature 42 of the base element 30, be used for the purpose of screwing-in, locking or pre-setting.

In its inside, the base element 130, too, includes a first portion 135 with a first inner diameter and the first portion 135 is axially distanced from the through opening 138. The through opening 138 and the first portion 135 are connected with each other via the transfer portion 144, which provides the abutment surface 146.

A first difference of the base element 130 compared with the base element 30 is the design of the second engagement features 148. They are not only configured as recesses but as slots which extend through the wall of the hollow cylindrically shaped base element. Furthermore, four circumferentially evenly distanced slots are present, which extend from the first axial end 132 beyond the transition portion 144, which may be up to a position adjacent to the second drive feature 142. Just as the recesses in the first embodiment of the connection unit 1, the slots serve for the form-fit force transmission from the connection screw 10 by means of the first engagement features 114 onto the base element 130. Additionally, the slots do, however, segment the first portion 135 of the base element, thus serving as a clearance for spreading the base element 130 in this area. In case of an inserted connection screw 110, a corresponding spreading takes place due to the interacting of the head 112 and the abutment surface 146, when the connection screw 110 is further pressed against the abutment surface due to the fastening nut C. This may be advantageous in case of a metal-metal thread connection between the first component and the base element, as due to the clamping which arises as a result, a play in the thread connection can be eliminated.

A further difference is the design of the abutment surface 146 of the transition portion 144. It is now configured in the shape of a truncated cone. With regard to the outer design, there is a difference in a portion 149 which is now present and which has a smaller outer diameter between the second drive feature 142 and the second outer thread 134. Both differences promote the above-described clamping effect.

Figure 19A:
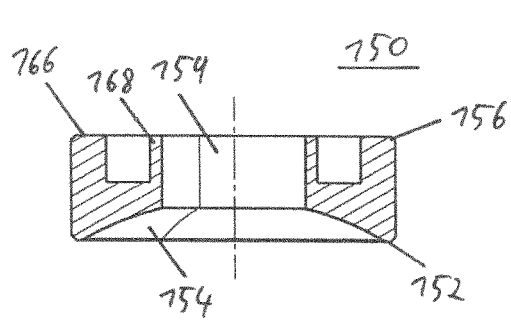
Figure 19B:
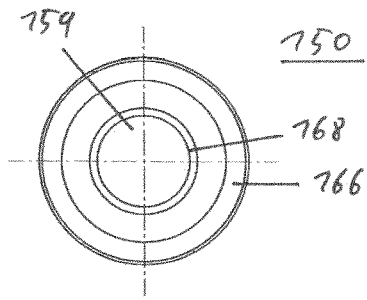
Figure 20:
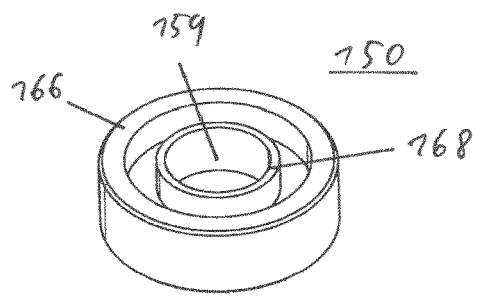

The abutment element 150 is illustrated in FIGS. 19a, 19b and 20. Here again, the first face side 152 includes a third ball segment 154. The second face side 156 does, however, comprise a radial, outer ring 166 as well as a radial inner ring 168. The radial, outer ring 166 later abuts the second component B, while the radial inner ring 166 provides an axial anti-loss security for the connection screw 110. After arranging the abutment element 150 on the shank 116 of the connection screw 110, which may be on the threadless portion 120, the radial inner ring 166 is radially pressed to the inside or stamped by means of a tool. In this way, the abutment element limits the movement of the connection screw 110 contrary to the insertion direction in the base element 130.

In this embodiment, the realizing of a pre-adjustable spatial angle position of the connection screw 110 may take place by means of a narrow fitting between the head 112 of the connection screw 110 and the first portion 135 of the base element 130.

Figure 21A:
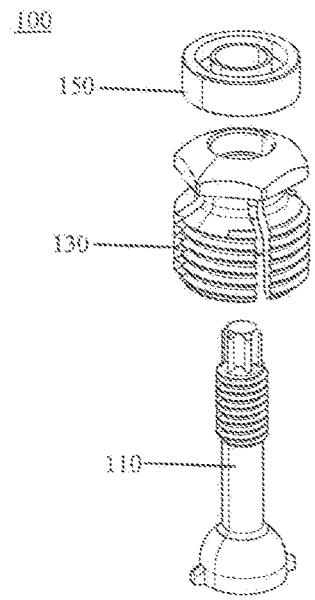
Figure 21B:
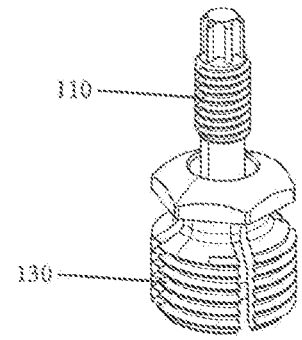
Figure 21C:
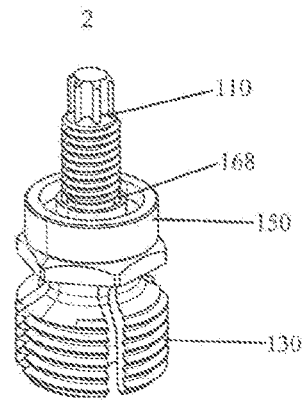

FIGS. 21a, 21b, 21c clarify the assembly of the connection unit 100, which takes place analogously to the assembly of the first connection unit 1. Firstly, the connection screw 110 is inserted into the base element 130 with the shank 116 first, until the head 112 abuts the abutment surface 146. After that, the abutment element 150 is arranged on the shank 116 and the radial inner ring 166 is pressed radially to the inside in order to provide an anti-loss security.

Figure 22:
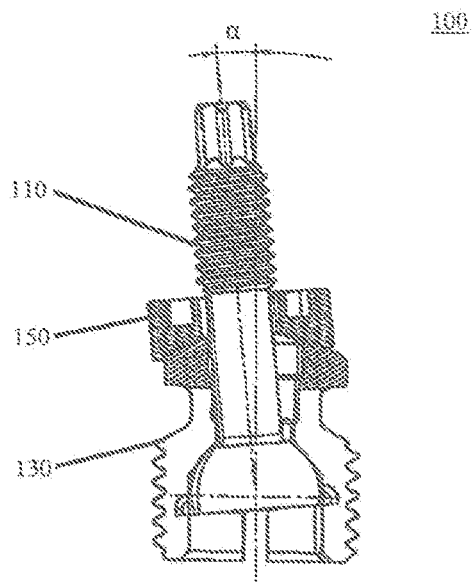

In contrast to the first embodiment of the connection unit 1, a smaller spatial angle can be realized with the second embodiment of the connection unit 100 due to the bigger axial distance between the abutment surface 146 and the second axial end 136 of the base element. It is for example approximately 5°. FIG. 22 illustrates a corresponding cut through the connection unit 100.

Figure 23:
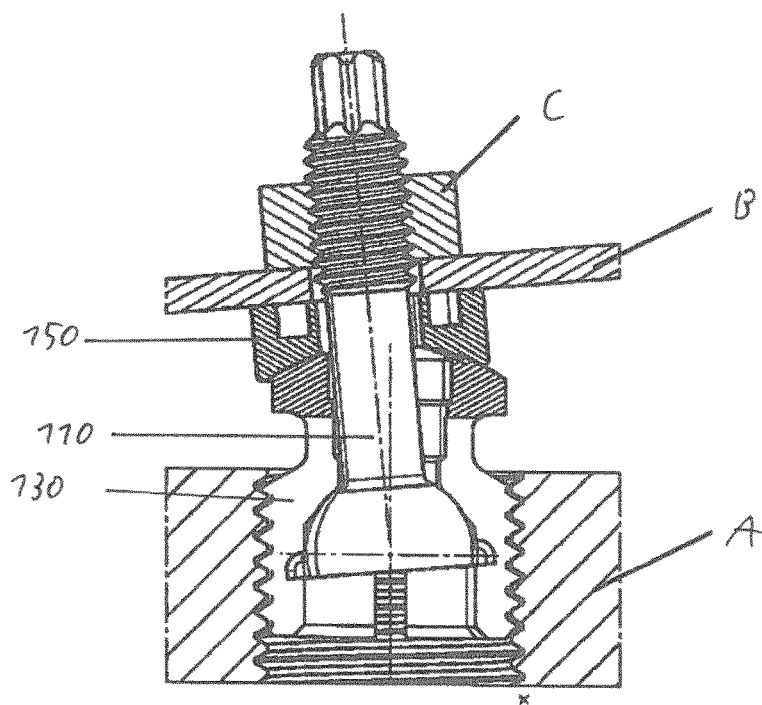

The use of the connection unit 100 is analogous to the connection unit 1. Therefore, FIG. 23 shows the connection unit 100 in the assembled stated. As is already the case regarding the first embodiment of the connection unit 1, the head 112 with the engagement features serves for the axial and form fit force transmission in this embodiment of the connection unit 100. Similarly, an angle compensation function is provided due to the interaction of head 112 and abutment surface 146. In addition and due to the slots, the head 112 now also serves for spreading the first portion 135 of the base element 130.

Figure 24:
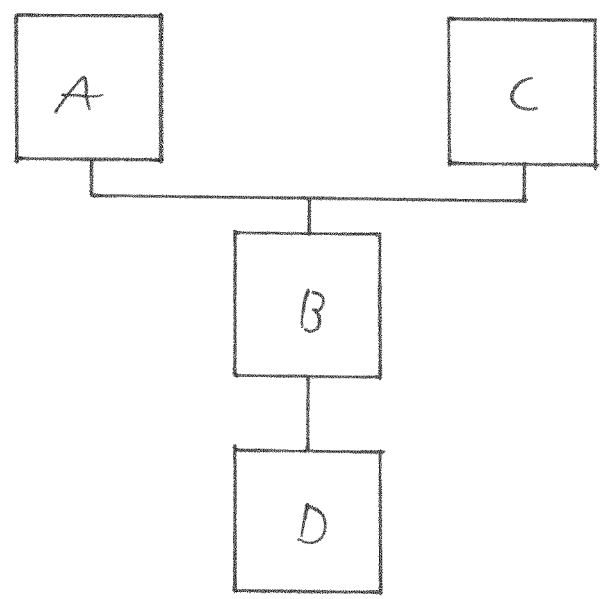

FIG. 24 shows a schematic course of methods of a manufacturing method for a connection unit 1; 100. In a first step A, a providing of the connection screw 10; 110 and of the base element 30; 130 takes place. The step of providing comprises the manufacturing of the connection screw 10; 110 and/or the base element 30; 130 by means of one of the following methods: molding, injection molding, additive methods and machining methods. The connection screw 10; 110 consists of metal, for example, and the base element 30; 130 is for example made of plastic or metal. In this way, the material can be adapted to the components A, B to be connected, wherein the design of the connection screw 10; 110 out of metal provides for a reliable force transmission.

At the same time, before it or after it, the providing of the abutment element 50; 150 takes place in step C. The providing of the abutment element 50; 150 can also comprise the manufacturing of the abutment element 50; 150 by means of one of the methods mentioned above for the base element 30; 130 or the connection screw 10; 110. Similarly, the abutment element 50; 150 can, depending on the application case, consist of metal or plastic. In addition, sealing elements 58, 70 can be provided for realizing a sealing function.

In a second step B, the connection screw 10; 110 is inserted into the base element 30; 130 with the shank 16; 116 first from the first axial end 32; 132 of the base element 30; 130.

Finally, in step D, an arranging of the abutment element 50; 150 on the portion of the shank 16; 116 of the connection screw 10; 110 which projects beyond the second axial end 36; 136 of the base element 30; 130 now takes place. This takes place such that the abutment element 50; 150 may provide an axial anti-loss security for the connection screw 10; 110, as is explained above.

Figure 25:
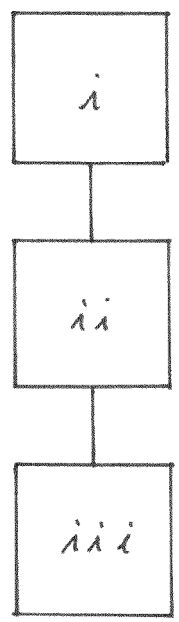

With reference to FIG. 25, a connection method of a first component A with a second component B with a distance in between by means of the connection unit 1; 100 is described. In a first step i, the base element 30; 130 of the connection unit 1; 100 is screwed into a first opening in the first component A. In a first case, this takes place by means of the second drive feature 42; 142 at the base element 30; 130. Alternatively, and when the connection screw 10; 110 comprises at least one first engagement feature 14; 114 at the head 12; 112 as well as a first drive feature 24; 124 at the side of the shank 16; 116 which faces away from the head, and when the base element 30; 130 comprises at least one second engagement feature 48; 148, then, the step of screwing in can also take place by means of the first drive feature 24; 124.

In a subsequent second step ii, the shank 16; 116 of the connection screw 10; 110 is arranged in a second opening of the second component B, so that the first outer thread 18; 118 of the connection screw 10; 110 extends at least partly through the second opening in the second component B.

Finally, in step iii, the screwing of a fastening nut C onto the first outer thread 18; 118 of the connection screw 10; 110 takes place for fixing the position of the first A and the second component B relative to one another.

An adjusting of the distance, which may be in case of an only one-sided accessibility of the components A, B to be connected, is realizable by means of the first drive feature 24; 124 of the connection screw 10; 110, as is explained above.

The invention claimed is:

1. A connection unit for connecting a first component with a second component with a distance in between, comprising:
   a. a connection screw with a head in the shape of a first ball segment as well as a shank extending from there, with the shank having a first outer thread of a first thread direction,
   b. a hollow-cylindrically shaped base element which includes the following features:
      b1. adjacent to a first axial end, a second outer thread of a second thread direction for the fastening in the first component and radially inwardly, a first portion with a first inner diameter are provided, b2. a through opening with a second inner diameter is provided at a second axial end, the diameter being smaller than the first inner diameter, and an outer side of the base element is designed in the shape of a second ball segment, wherein b3. the first portion and the through opening are axially distanced from each other and connected by a transition portion, which at least partly provides an abutment surface for the head of the connection screw, and the shank of the connection screw extends through the through opening, wherein c. the connection screw comprises at least one first engagement feature at the head and the base element comprises at least one axially extending second engagement feature, which interact with each other for the form-fit transmission of a rotation movement.

2. The connection unit according to claim 1, in which the connection screw has a first drive feature at the side of the shank which faces away from the head.

3. The connection unit according to claim 2, in which the connection screw has at least two first engagement features and the base element has at least two second engagement features with the first and the second engagement features each being spaced from each other circumferentially evenly.

4. The connection unit according to claim 2, in which the at least one second engagement feature is a slot which extends radially through the base element and a portion with a smaller outer diameter is provided between the second outer thread of the base element and the second axial end of the base element.

5. The connection unit according to claim 1, in which the second outer thread of the base element is configured in a self-cutting or self-grooving way.

6. The connection unit according to claim 1, in which the shank of the connection screw has a threadless portion adjacent to the head and includes the first outer thread at a distance to the head.

7. The connection unit according to claim 6, in which the connection screw has, in the threadless portion, a radial projection for supporting a sealing element.

8. The connection unit according to claim 1, in which the base element has a second drive feature adjacent to the second axial end.

9. The connection unit according to claim 1, in which the second inner diameter of the base element continuously tapers from the second axial end in the direction of the transition portion.

10. The connection unit according to claim 1, which further includes an abutment element which is arranged on the shank of the connection screw.

11. The connection unit according to claim 10, in which a first face side of the abutment element has the shape of a third ball segment which interacts with the second ball segment at the second axial end of the base element.

12. The connection unit according to claim 11, in which the abutment element includes a sealing element at the second face side which faces away from the base element.

13. The connection unit according to claim 10, in which the abutment element has a radial outer ring as well as a radial inner ring at a second face side which faces away from the base element, wherein the radial inner ring provides an axial anti-loss security for the connection screw.

14. The connection unit according to claim 10, in which the abutment element comprises at least one radially inwardly protruding projection in a through opening as well as a third drive feature at a radial outer side, so that the abutment element is screwable onto the connection screw and provides an axial anti-loss security for the connection screw.

15. The connection unit according to claim 1, in which the first thread direction and the second thread direction are the same.

16. A first component, in which a base element of a connection unit according to claim 1 is screwed in.

17. A connection of a first and a second component in which a base element of a connection unit according to claim 1 is screwed into the first component and the first outer thread of the connection screw extends at least partially through an opening in the second component as well as is in engagement with a fastening nut, whereby the connection screw is fixed in a predeterminable spatial angle.

* * * * *